Figure 1:
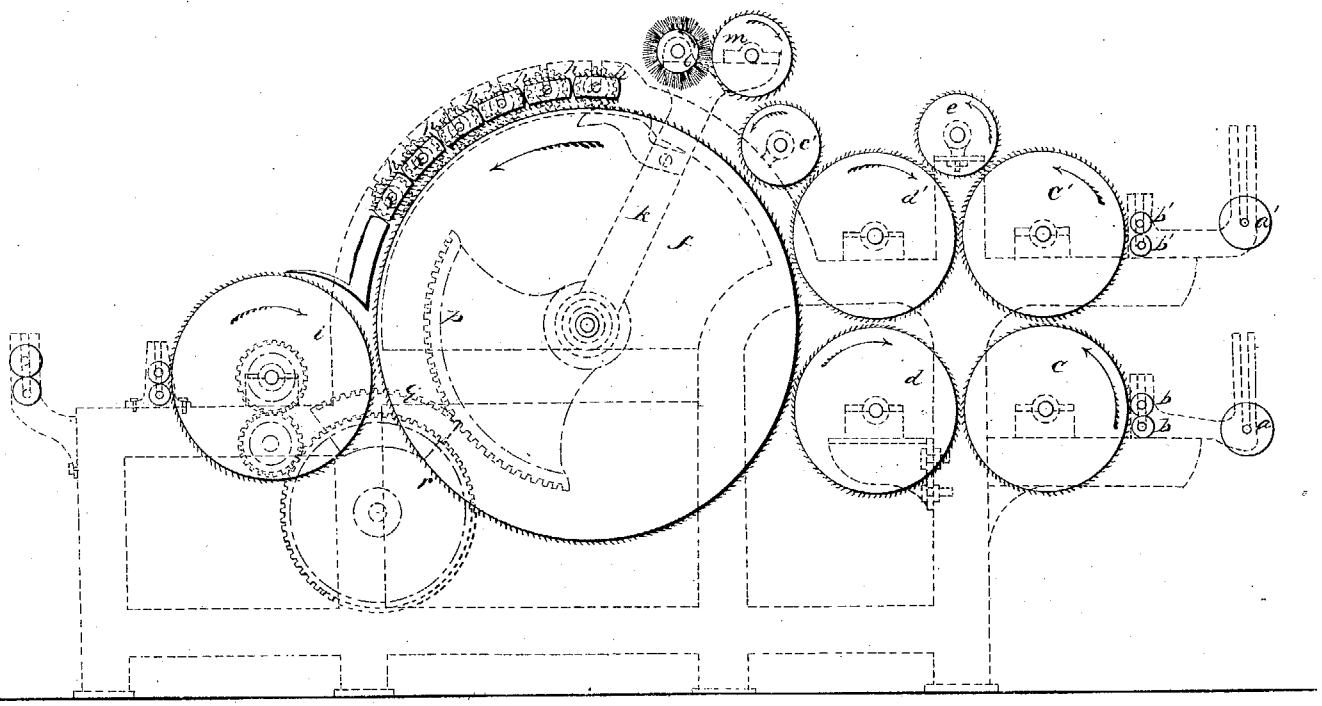

W. H. Walton.
Carding Mach.

No. 422. Reissued Jan. 13, 1857.

Inventor:
W. H. Walton

N. PETERS, PHOTO-LITHOGRAPHER, WASHINGTON, D. C.

UNITED STATES PATENT OFFICE.

WILLIAM H. WALTON, OF NEW YORK, N. Y.

IMPROVEMENT IN CLEANING THE TOP FLATS OF CARDING-ENGINES.

Specification forming part of Letters Patent No. 16,196, dated December 9, 1856; Reissue No. 422, dated January 13, 1857.

*To all whom it may concern:*

Be it known that I, WILLIAM H. WALTON, of the city, county, and State of New York, have invented certain new and useful Improvements in Carding Machinery; and I do hereby describe and ascertain my invention as follows, referring therein to the accompanying drawing, which is a vertical longitudinal section of my machine.

My invention relates to an improvement in stripping the top-flats or lags of machine-cards by certain automatic apparatus, and in the combination, application, and arrangement of "lickers-in" acting as workers by being brought into contact with each other and having intermediate small cylinder-workers in connection therewith. These devices consist of top-flats or lags suspended upon pivots placed in the center of their ends with toothed pinions upon them, by which they are raised from their position and turned over to be stripped, a rotating brush being employed to strip the flats or lags, which is so arranged as to be in its turn stripped by a cylinder card or worker that returns the strippings to the lickers-in, four of which are worked in contact, acting as workers to return the strippings along with the fiber fed into the machine properly to the main cylinder. This operation is continued till the whole fiber is properly worked and passes through the card.

The construction of the machine is as follows: The position of the main carding-cylinder, the doffer, together with the construction of the same, are as carding-machines now in use, with one or two feeds, (in the drawing two separate points of feeding in are shown,) and intermediate between the feed-rollers and the main cylinder are four lickers-in, which are also made to serve the purpose of workers and strippers, being so arranged and working together as to cause the cotton to be fairly and evenly presented to the main carding-cylinder, from which the unworked fibers, &c., are in great measure carried back to the lickers in and worked over and again presented to the cylinder, by which I make a saving of workers and strippers on the main cylinder as in the old method, and facilitate the operation of carding.

*a a'* are the two rolls from which the cotton is delivered to the machine. They are placed one directly above the other. From thence it passes to and between two small rollers, *b b* or *b' b'*, when used. The cotton from the lower feed, *a*, passes onto the first licker-in cylinder *c*, that from *a'*, when used, passes in the same way onto licker-in or worker *c'*. The two cylinders *c c'* work together and partially straighten and equalize the fibers. From thence the cotton is taken onto the lickers-in *d d'*, where it is again worked, in aid of which there is above and between *d'* and *c'* a small top worker, *e*. The course of revolution of these rollers is indicated by arrows, and they are driven by gearing in manner well known to machinists and carding-machine makers. A similar small roller to *e* is placed at *e'*, nearer the main cylinder than *e*, which work the cotton on the main cylinder *f*, and is stripped by the cylinder or licker-in *d'*, which passes against the licker-in *d*. The cotton received from *e'* is repassed on the main cylinder *f*, with the cotton brought forward from the feeding-in rollers. By this method the material is more evenly laid on the main cylinder before being presented to the flats or lags. The cylinder *f* runs in contact with the lickers-in *d* and *d'*, and from each receives the fibers for carding rapidly, evenly, and properly in quantity much greater than has ever before been effected in a given time. Cylinder *f* passes around to the flats or top workers *h*, and thence to the doffer *i*, whence it passes out of the machine in the usual way. Each of the flats or top workers *h* are clothed on both sides, and their ends rest on a ledge or screws on the permanent frame, outside of which there is an upward projection of the frame, having recesses in it, that serve for guards for round journals *x*, which project from the ends of the workers or top-flats *h*. At one end there is a pinion affixed to the joint of each worker or top-flat *h*. An arm, *k*, is centered on the journals of axis of the main cylinder *f* on each side, which project upward above the top of said cylinder *f*, and form bearings for a cylinder-brush *l*, of small diameter, and a clothed cylinder or doffer, *m*, a little behind and above. When the arms *k* sweep forward the brush which is in rapid revolution, driven by a band from the main cylinder shaft, brushes over and cleans the side of the flats or workers *h*, that is uppermost, the brush being in turn cleaned by the revolving card-cylinder *m*, whence the fibers are conveyed to the cylinder *e'*, and are reconveyed upon the cylinder *f*. As the arms *k* move forward, as above stated, a projecting piece, *k'*, strikes the workers or flats and raises them from their bed, and the piece *k'* on one side, being cogged, takes into the pinions on their journals and causes each to make a semi-revolution, thus bringing the working surface up to be cleaned by the action of the brush *l*, which succeeds. The arms *k* have a segment-gear, *p*, affixed to them, that gears into a segment, *q*, on a revolving wheel, *r*, driven by gearing from the doffer *i'*; or there are two of these wheels *r*, and they run in opposite directions, by which means the arms *k* vibrate first forward and then back. The gearing is shown in the drawing in blue ink.

I wish it to be distinctly understood that I do not claim two sets of feed-rollers combined with a carding-machine, as they have before been made and used; nor do I claim two lickers-in working directly out to the main cylinder, as they are to be found on machines previously devised; but What I do claim as my invention, and for which I desire to secure Letters Patent, is—

1. Suspending the top-flats or lags upon pivots in the center of the ends, by which they can be raised out of the way of the adjoining flats or lags to be turned by means of a rack working on pinions upon their pivots, or the equivalent thereof, the whole being constructed and arranged substantially as herein described, for the purpose set forth.

2. Stripping the flats or workers by a rotating brush so arranged that a card may in turn strip the brush and return the strippings to the main cylinder, substantially in the manner and for the purposes described.

3. The combination and employment of the lickers-in *c c' d d'* and worker *e*, arranged substantially as herein described, and acting as workers and strippers, in the manner and for the purpose described.

W. H. WALTON.

Witnesses:
GEO. H. PHINNEY,
JOHN S. HOLLINGSHEAD.